United States Patent [19]

Zuiss et al.

[11] Patent Number: 5,237,429

[45] Date of Patent: Aug. 17, 1993

[54] FACSIMILE INTERFACE DEVICE FOR RADIOS

[75] Inventors: Thomas J. Zuiss, Watauga; Richard E. Murray, Arlington, both of Tex.

[73] Assignee: Motorola, Inc., Schaumburg, Ill.

[21] Appl. No.: 823,053

[22] Filed: Jan. 17, 1992

Related U.S. Application Data

[63] Continuation of Ser. No. 532,840, Jun. 4, 1990, abandoned.

[51] Int. Cl.⁵ .......................... H04N 1/00; H04B 1/38
[52] U.S. Cl. ...................................... 358/442; 358/435; 358/437; 379/100
[58] Field of Search ............... 358/442, 443, 435, 436, 358/437, 407, 438, 439; 379/100; 370/24; 455/89, 78

[56] References Cited

U.S. PATENT DOCUMENTS

| | | | |
|---|---|---|---|
| 4,658,096 | 4/1987 | West et al. | 379/59 |
| 4,737,975 | 4/1988 | Shafer | 379/58 |
| 4,775,997 | 10/1988 | West et al. | 379/58 |
| 4,809,297 | 2/1989 | Polansky et al. | 375/7 |
| 4,864,412 | 9/1989 | Ueno | 358/436 |
| 4,881,129 | 11/1989 | Mitsuhashi | 358/434 |
| 4,933,770 | 7/1990 | Despain | 358/434 |
| 4,956,876 | 9/1990 | Koshiishi | 379/100 |
| 4,977,609 | 12/1990 | McClure | 358/442 |

*Primary Examiner*—Edward L. Coles, Sr.
*Assistant Examiner*—Jerome Grant, II
*Attorney, Agent, or Firm*—Pablo Meles; Lesley Ann Rhyne

[57] ABSTRACT

Briefly, according to the invention, the interface device comprises matching device (20 and 22) for coupling a duplex information signal (21 and 23) to a simplex or a duplex radio (6) which provides a corresponding information signal (27) acknowledged by the half duplex or full duplex radio (6). Additionally, a signal detecting means (24) determines a desired signal strength and controls an interrupt signal (32). A means for sending (26) the interrupt signal (32) to the radio (6) sends the interrupt signal once the signal detecting means detects the desired signal strength. Finally, the interface device of the present invention comprises a means for sending (26) the corresponding information (27) once the interrupt signal is sent.

12 Claims, 1 Drawing Sheet

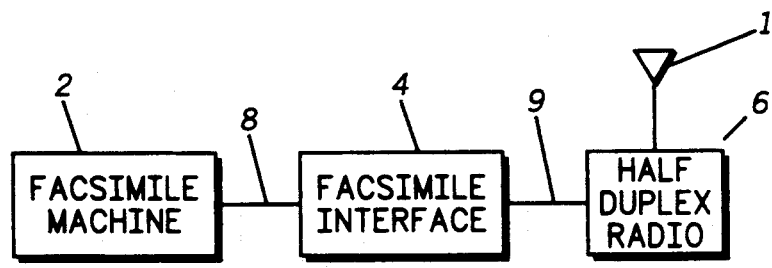
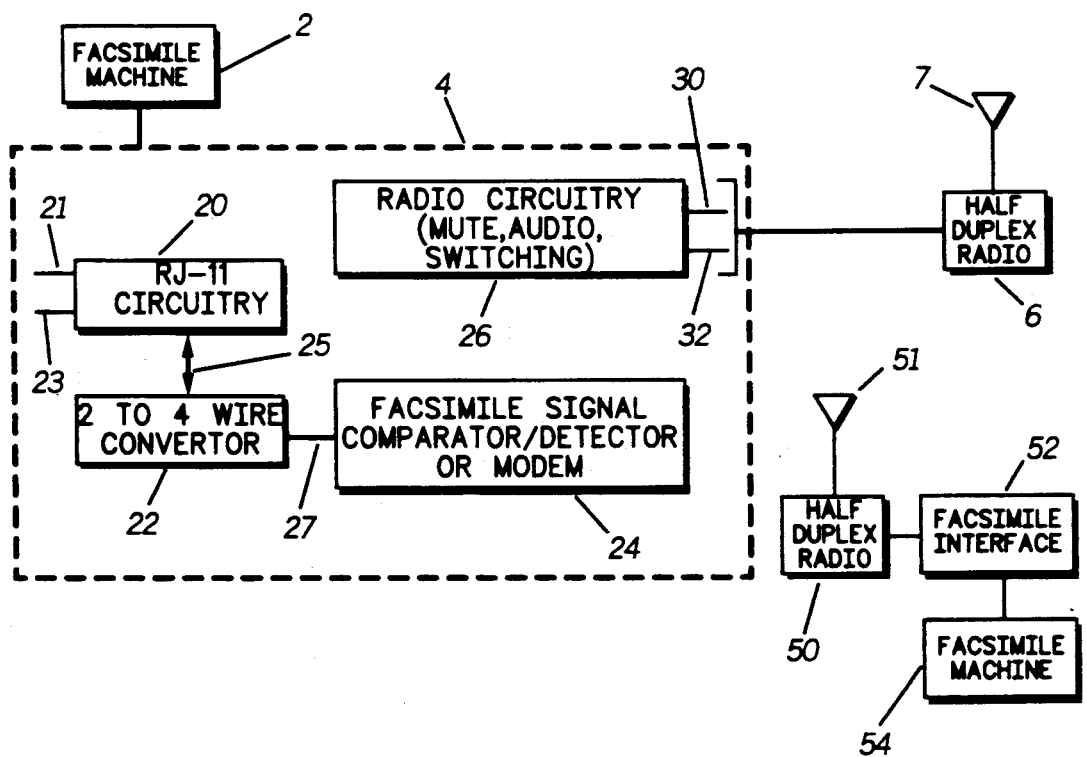

FACSIMILE INTERFACE DEVICE FOR RADIOS

This is a continuation of application Ser. No. 07/532,840, filed Jun. 4, 1990 and now abandoned.

TECHNICAL FIELD

This invention relates generally to the field of facsimile interface devices for communication devices, and more specifically to a device for connecting a facsimile device to either a full duplex or simplex radio.

BACKGROUND

Conventional interfacing devices for transmission of duplex information allows for receipt of the information by full-duplex radios such as cellular phones. The increasing demand for installation of facsimile devices (which typically provide full-duplex information) in motor vehicles which have typical mobile radios may be precluded from receiving facsimile transmissions because their radio systems are not full duplex, but rather half-duplex or simplex. The previous solution to this problem would be to simply provide for a separate duplex radio or otherwise receive a non-standard simplex fax. Another solution includes using a non-standard fax machine that would have control lines linking with the interface device for controlling the receive and transmit mode. The present invention eliminates these restraints by providing an interface between the duplex signals of a standard telephone type FAX machine and a half-duplex radio.

SUMMARY OF THE INVENTION

Accordingly, it is an object of the present invention to provide a facsimile interface device for duplex to simplex radio communication Briefly, according to the invention, the interface device comprises matching means for coupling a duplex information signal to a simplex or a duplex radio which provides a corresponding information signal acknowledged by the half duplex or full duplex radio. Additionally, a signal detecting means determines a desired signal strength and controls an interrupt signal. A means for sending the interrupt signal to the radio once the signal detecting means detects the desired signal strength. Finally, the interface device of the present invention comprises a means for sending the corresponding information once the interrupt signal is sent.

BRIEF DESCRIPTION OF THE DRAWINGS

FIG. 1 is a schematic block diagram of a full duplex to half duplex data transmission system.

FIG. 2 is a schematic block diagram of a facsimile interface in operation within a data transmission system.

DETAILED DESCRIPTION OF THE PREFERRED EMBODIMENT

Referring to FIG. 1, there is shown a block diagram of the present invention. A conventional duplex FAX machine such as Facsimile Machine 2 sends duplex information signals (8) to a facsimile interface device 4. The facsimile interface device 4 provides for impedance, voltage and current matching as is known in the art between the Facsimile Machine 2 and a half duplex radio 6. The device 4 sends and receives transmit and receive audio along with control signals including an interrupt signal which functions as a push to talk (PTT) switch. The interrupt signal is generated from within the device 4 in response to the audio signal from the facsimile machine 2, rather than from control signals from a fax machine as is known in the art. In other words, the facsimile interface device 4 examines the (audio) Fax transmission (8) from the Facsimile machine 2 and determines when the half duplex radio 6 should be transmitting (via antenna 7). Even though the the Facsimile machine 2 interfaces via a duplex connection, the interface device 4 is able to determine when to transmit since the data transmissions are simplex, with sufficient time between receiving and transmitting data for the radio to start transmitting. During this time, the device 4 activates the half duplex radio's (6) PTT line. Otherwise, the half duplex radio 6 is receiving at all other times.

Referring to FIG. 2, there is shown the facsimile interface 4 connecting one facsimile machine (2) to another facsimile machine (54) via two half duplex radios (6 and 50) each having antennas (7 and 51 respectively.) An RJ-11 circuit 20, coupled to a duplex signal source such as facsimile machine 2 receives a ring and tip signal on lines 21 and 23 respectively. The 2 to 4 wire convertor 22 receives a telephone line matched signal 25 from the RJ-11 circuit and provides separate radio Receive and Transmit audio signals. The 2 to 4 wire conversion can be done using Motorola's integrated circuit parts MC34014 and MC3419.

A facsimile signal comparator/detector 24 comprises a signal detector, a comparator and a Push-To-Talk (PTT) generating circuit. In one embodiment of the present invention, the comparator will look for sufficient energy from the detector to cause the radio 6 to start a transmission of the FAX data. When the energy falls below a lower threshold, the radio 6 will stop transmission. Since facsimile machine modulation uses a phase modulated carrier, the energy content of the carrier will remain relatively constant during the data transmission and the radio will not de-key until the transmission has been completed. No carrier signal is generated by the facsimile machine during receive.

In an alternative embodiment of the present invention, the detector/comparator 24 will actually decode the data being sent by the facsimile machine 2 and determine when to transmit or receive. Numerous integrated circuits are available (Yamaha YM7109 for example) that can demodulate Fax data. Using this approach will prevent any possible falsing problems that could occur using the energy detection approach described above.

In either embodiment, when the detector/comparator 24 determines that the radio 6 should be transmitting, radio circuitry 26 should mute the radio microphone audio, activate the radio PTT and route the Fax machine audio (30) to the radio modulation circuitry (6). When the facsimile interface 4 receives fax information from another facsimile machine (54), the receive audio should be routed to the facsimile machine 2 through the 2 to 4 wire convertor 22. The radio speaker in the half duplex radio 6 should also be muted during a Fax reception.

Implementing the alternative embodiment (using the Yamaha YM7109 for example) would increase the flexibility of fax machines and provide additional features since the interface 4 could examine the data being sent to the facsimile machine 2. Such features include the group wide Fax, wherein a Fax transmission sent over a radio channel could be sent to multiple users at the same time without a significant increase in required RF airtime. A destination ID (typically the telephone extension) would be required for each user. An Acknowledgement feature would provide the sending party notice that the receiving party actually picked up the Fax. This could be done by either sensing the page being removed or the operator manually pressing a button on the receiving Fax machine. The Acknowledgement feature would save the normal step of calling the receiving party to determine if the Fax was received correctly. Another feature, Page On Receipt could have the radio system automatically page the receiving party when the Fax was received. The receiving radio could automatically page the user or tie into a separate paging system using the radio ID or telephone number to which the Fax was sent once the Fax transmission triggers the paging system.

What is claimed is:

1. A facsimile interface device for duplex to simplex radio communication, comprising:
   matching means for coupling a duplex information signal to a half duplex radio, providing a corresponding simplex information signal acknowledged by said radio;
   signal detecting means for determining a desired signal strength from the duplex information signal and for controlling an interrupt signal to a half-duplex radio;
   a PTT generating circuit for generating the interrupt signal to the half-duplex radio, said PTT generating circuit being coupled to the signal detecting means;
   means for sending the interrupt signal external from the duplex information signal to said radio once said signal detecting means detects said desired signal strength;
   means for sending the corresponding simplex information signal once the interrupt signal is sent, allowing suffient time between receiving and transmitting data for the half-duplex radio to start transmitting.

2. The facsimile interface device of claim 1, wherein said matching means comprises an RJ-11 circuit coupled to a 2 to 4 wire convertor.

3. The facsimile interface device of claim 1, wherein the facsimile interface device allows for a group wide FAX which provides for transmission of facsimile information over a radio channel to multiple users at the same time.

4. The facsimile interface device of claim 1, wherein a sending party of a FAX is notified when a receiving party receives the FAX by a status information signal triggered by paper movement in the receiving party's fax.

5. The facsimile interface device of claim 1, wherein said signal detecting means comprises a facsimile signal detector and a comparator output capable of controlling the interrupt signal.

6. The facsimile interface device of claim 5, wherein said signal detecting means further comprises a comparator.

7. The facsimile interface device of claim 6, wherein said signal detecting means further comprises a modem.

8. The facsimile interface device of claim 1, wherein a Page On Receipt feature automatically pages a receiving party of a facsimile copy when the facsimile copy is received.

9. The Page on Receipt feature of claim 8, wherein the receiving party is paged via said radio.

10. The Page on Receipt feature of claim 8, wherein the receiving party is paged via a separate paging system.

11. The Page on Receipt feature of claim 8, wherein the receiving party is paged via a fax telephone line.

12. The facsimile interface device of claim 1, wherein said means for sending the interrupt signal and means for sending the corresponding information signal comprises a buffer, and a mute for transmit and receive audio when said simplex information is being sent or received.

* * * * *